(12) United States Patent
Cho et al.

(10) Patent No.: US 7,481,567 B2
(45) Date of Patent: Jan. 27, 2009

(54) BACKLIGHT ASSEMBLY AND LIQUID CRYSTAL DISPLAY DEVICE USING THE SAME

(75) Inventors: Joo Woan Cho, Seoul-Si (KR); Sang Yu Lee, Gyeonggi-Do (KR); Gi Cherl Kim, Gyeonggi-Do (KR); Chun-Ho Song, Seoul (KR); Sang Hoon Lee, Gyeonggi-Do (KR); Seock Hwan Kang, Gyeonggi-Do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 40 days.

(21) Appl. No.: 11/336,027

(22) Filed: Jan. 20, 2006

(65) Prior Publication Data

US 2006/0285362 A1    Dec. 21, 2006

(30) Foreign Application Priority Data

Jun. 16, 2005    (KR) ...................... 10-2005-0051792

(51) Int. Cl.
*F21V 7/04*    (2006.01)

(52) U.S. Cl. ........................ 362/632; 362/294; 362/561; 349/58

(58) Field of Classification Search ................. 362/632, 362/294, 373, 561, 580, 612, 634, 800, 812; 349/58, 65, 68, 69
See application file for complete search history.

(56) References Cited

U.S. PATENT DOCUMENTS

| | | | |
|---|---|---|---|
| 5,660,461 A | * | 8/1997 | Ignatius et al. ............... 362/241 |
| 6,134,092 A | * | 10/2000 | Pelka et al. ..................... 361/31 |
| 6,609,807 B2 | * | 8/2003 | Torihara et al. ............. 362/613 |
| 6,871,981 B2 | * | 3/2005 | Alexanderson et al. ..... 362/294 |
| 7,086,773 B2 | * | 8/2006 | Kim et al. .................... 362/621 |
| 2006/0098457 A1 | * | 5/2006 | Chen et al. .................. 362/632 |

(Continued)

FOREIGN PATENT DOCUMENTS

JP    2002-229022    8/2002

(Continued)

*Primary Examiner*—Hargobind S Sawhney
(74) *Attorney, Agent, or Firm*—MacPherson Kwok Chen & Heid LLP

(57) ABSTRACT

A backlight assembly and a liquid crystal display device can discharge heat from the lamp unit to the outside or effectively dissipate the heat. The backlight assembly of the present invention includes a lamp unit, a receiving member for receiving the lamp unit, a first heat dissipation member disposed below the receiving member, and a second heat dissipation for wrapping around a lateral side of the receiving member and the first heat dissipation member. The lamp unit is disposed on an area corresponding to the lateral side of the receiving member. In one embodiment, the first heat dissipation member is a flat plate made of graphite and disposed on an outer side of the bottom of the receiving member. The second heat dissipation member is metal with good thermal conductivity in close contact with the first heat dissipation member and the lateral side of the receiving member where the lamp unit is disposed. Thus, the heat discharged from the lamp unit can be distributed uniformly over the entire area of the receiving member. In addition, the lateral side of the receiving member where the lamp unit is disposed can be replaced with the second heat dissipation member.

22 Claims, 5 Drawing Sheets

U.S. PATENT DOCUMENTS

| | | | |
|---|---|---|---|
| 2006/0146531 A1* | 7/2006 | Reo et al. | 362/244 |
| 2006/0187660 A1* | 8/2006 | Liu | 362/294 |

FOREIGN PATENT DOCUMENTS

| | | |
|---|---|---|
| JP | 2002-278480 | 9/2002 |
| JP | 2003-036717 | 3/2003 |
| JP | 2003-076287 | 3/2003 |
| JP | 2004-004581 | 1/2004 |
| JP | 2004-095655 | 3/2004 |
| JP | 2005-038771 | 2/2005 |
| KR | 10-2004-0057269 | 7/2004 |
| KR | 10-2004-0086604 | 10/2004 |
| KR | 10-2005-0002566 | 1/2005 |
| KR | 10-2005-0003688 | 1/2005 |
| KR | 10-2005-0016083 | 2/2005 |

* cited by examiner

BACKLIGHT ASSEMBLY AND LIQUID CRYSTAL DISPLAY DEVICE USING THE SAME

BACKGROUND OF THE INVENTION

1. Field of the Invention

The present invention relates to a backlight assembly and to a liquid crystal display device using the same, and more particularly, to a backlight assembly and a liquid crystal display device using the same, which can reduce edge dark spots occurring in a direct type backlight structure.

2. Description of the Related Art

In general, liquid crystal display devices have been widely employed in the art due to a variety of advantageous features such as light weight, slim shape, low power consumption, full-color implementation and high resolution. Recently, liquid crystal display devices have been utilized in computers, notebooks, PDAs, telephones, TV sets, audio/video devices and the like. In such liquid crystal display devices, the light transmissivity is controlled to display desired images on liquid crystal display panels, depending upon image signals applied to a plurality of control switches arranged in a matrix pattern.

A liquid crystal display device is not a self light-emitting device, and thus, it needs a light source such as a backlight. The backlight for the liquid crystal display device is categorized as an edge type or a direct type according to the position of the light source.

In the edge type backlight, the light source is installed in an edge area of the liquid crystal display panel such that light emitted from the light source is radiated on the liquid crystal display panel through a transparent waveguide plate placed below the liquid crystal display panel. This type provides a good light uniformity, has an extended life span, and is advantageous in fabricating a slim device. In general, this edge type is employed to radiate light on a medium-size or small-size liquid crystal display panel. On the other hand, in the direct backlight type, a plurality of light sources are placed below the liquid crystal display panel such that light emitted from the light source is radiated directly over the entire surface of the liquid crystal display panel. This type of backlight can provide high luminance and is generally used for radiating light on a large-size or medium-size liquid crystal display panel.

Conventionally, a cold cathode fluorescent lamp has been used as a light source for liquid crystal display panels. Recently, researches have been extensively made in order to use an LED lamp as the light source since the LED lamp has advantages such as long life span, lower power consumption, light weight and slim shape. However, the LED lamp has a drawback in that it generates lots of heat as compared with the conventional fluorescent lamp. Therefore, there are problems in that reliability for electric circuits or the like can be degraded due to increase in the internal temperature of a backlight assembly caused by this heat from the LED lamp, and deformation of the parts or cases may be produced due to thermally stresses caused by the internal temperature gradient.

SUMMARY OF THE INVENTION

Accordingly, in accordance with the present invention the aforementioned problems in the art are solved. An object of the present invention is to provide a backlight assembly and a liquid crystal display device using the same, in which heat generated from a lamp unit can be discharged to a receiving member and to the atmosphere by using a thermally conductive material having a good thermal conductivity.

Another object of the present invention is to provide a backlight assembly and a liquid crystal display device using the same, in which a sidewall of the receiving member is formed of a thermally conductive material such that the heat from the lamp unit can be discharged to the outside through the sidewall of the receiving member.

According to one aspect of the present invention for achieving the objects, there is provided a backlight assembly, comprising a lamp unit, a receiving member for receiving the lamp unit, a first heat dissipation member disposed below the receiving member, and a second heat dissipation member for wrapping around a lateral side of the receiving member and the first heat dissipation member.

Preferably, the first heat dissipation member is manufactured in the form of a flat plate and disposed on an outer side of the bottom of the receiving member corresponding to a position where the lamp unit is received. Further, it is preferred that the first heat dissipation member includes copper, copper alloy or graphite and the second heat dissipation member includes copper or copper alloy. More preferably, the second heat dissipation member is manufactured in a bent shape and brought into close contact with the first heat dissipation member and the lateral side of the receiving member corresponding to a position where the lamp unit is received.

The backlight assembly of the present invention may further comprise thermal pads formed between the second heat dissipation member and the receiving member and between the first heat dissipation member and the second heat dissipation member.

Preferably, the lamp unit is disposed on at least a portion of an inner surface of the lateral side of the receiving member.

According to another aspect of the present invention, there is provided a backlight assembly, comprising a lamp unit, and a receiving member having a receiving space for receiving the lamp unit therein, wherein the receiving member includes a body portion, a lateral end portion coupled with the body portion for defining the receiving space, and a heat dissipation member placed between the body portion and the lateral end portion.

Preferably, the lateral end portion includes thermally conductive copper or copper alloy and the heat dissipation member includes copper, copper alloy or graphite.

More preferably, the body portion includes a rectangular bottom plate and at least one sidewall protruding from the bottom plate, and the lateral end portion is connected to an edge area of the body portion, on which the sidewall is not formed, to define a sidewall of the receiving member.

Preferably, the lateral end portion includes a connecting section to be coupled with the bottom plate of the body portion and a sidewall bent and extending from the connecting section, and the lamp unit is disposed on and connected to the sidewall of the lateral end portion.

Preferably, the body portion is manufactured in the form of a rectangular plate, and the lateral end portion is connected to an edge area of the body portion to define a sidewall of the receiving member. Further, it is preferred that the lateral end portion includes a connecting section to be coupled with a bottom surface of the body portion and a sidewall bent and extending from the connecting section. More preferably, the lamp unit is disposed on and connected to the sidewall.

Further, the lamp unit preferably includes an LED lamp. The backlight assembly of the present invention may further comprise a reflective plate disposed below the lamp unit. In addition, the backlight assembly of the present invention may further comprise an optical sheet disposed above the lamp unit.

According to a further aspect of the present invention, there is provided a liquid crystal display device, which comprises a backlight assembly including a lamp unit for generating light, a receiving member for receiving the lamp unit, a first heat dissipation member disposed below the receiving member, and a second heat dissipation member for wrapping around a lateral side of the receiving member and the first heat dissipation member; and a liquid crystal display panel for displaying an image using the light supplied from the backlight assembly.

Preferably, the first heat dissipation member includes copper, copper alloy or graphite in the form of a flat plate and is disposed on an outer side of the bottom of the receiving member corresponding to a position where the lamp unit is received.

Further, the second heat dissipation member preferably includes copper or copper alloy in the form of a bent shape and is brought into close contact with the first heat dissipation member and the lateral side of the receiving member corresponding to a position where the lamp unit is received. The lamp unit including an LED lamp may be disposed on at least a portion of the lateral side of the receiving member.

According to a still further aspect of the present invention, there is provided a liquid crystal display device, which comprises a backlight assembly including a lamp unit generating light, and a receiving member having a receiving space for receiving the lamp unit therein, wherein the receiving member includes a body portion, a lateral end portion coupled with the body portion for defining the receiving space, a heat dissipation member placed between the body portion and the lateral end portion; and a liquid crystal display panel for displaying an image using the light supplied from the backlight assembly.

Preferably, the lateral end portion includes thermally conductive copper or copper alloy, and the heat dissipation member includes copper, copper alloy or graphite.

Preferably, the body portion includes a rectangular bottom plate and at least one sidewall protruding from the bottom plate, and the lateral end portion is connected to an edge area of the body portion where the sidewall is not formed, thereby defining a sidewall of the receiving member on which the lamp unit is disposed.

Preferably, the body portion is manufactured in the form of a rectangular plate, the lateral end portion is connected to an edge area of the body portion to define a sidewall of the receiving member, and the lamp unit is disposed on at least one sidewall of the receiving member.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Hereinafter, preferred embodiments of the present invention will be described in detail with reference to the accompanying drawings. However, the present invention may be embodied in many different forms and should not be construed as being limited to the embodiments set forth herein. Rather, these embodiments are provided such that this disclosure will be thorough and complete and will fully convey the scope of the present invention to those skilled in the art.

First Embodiment

Figure 1:
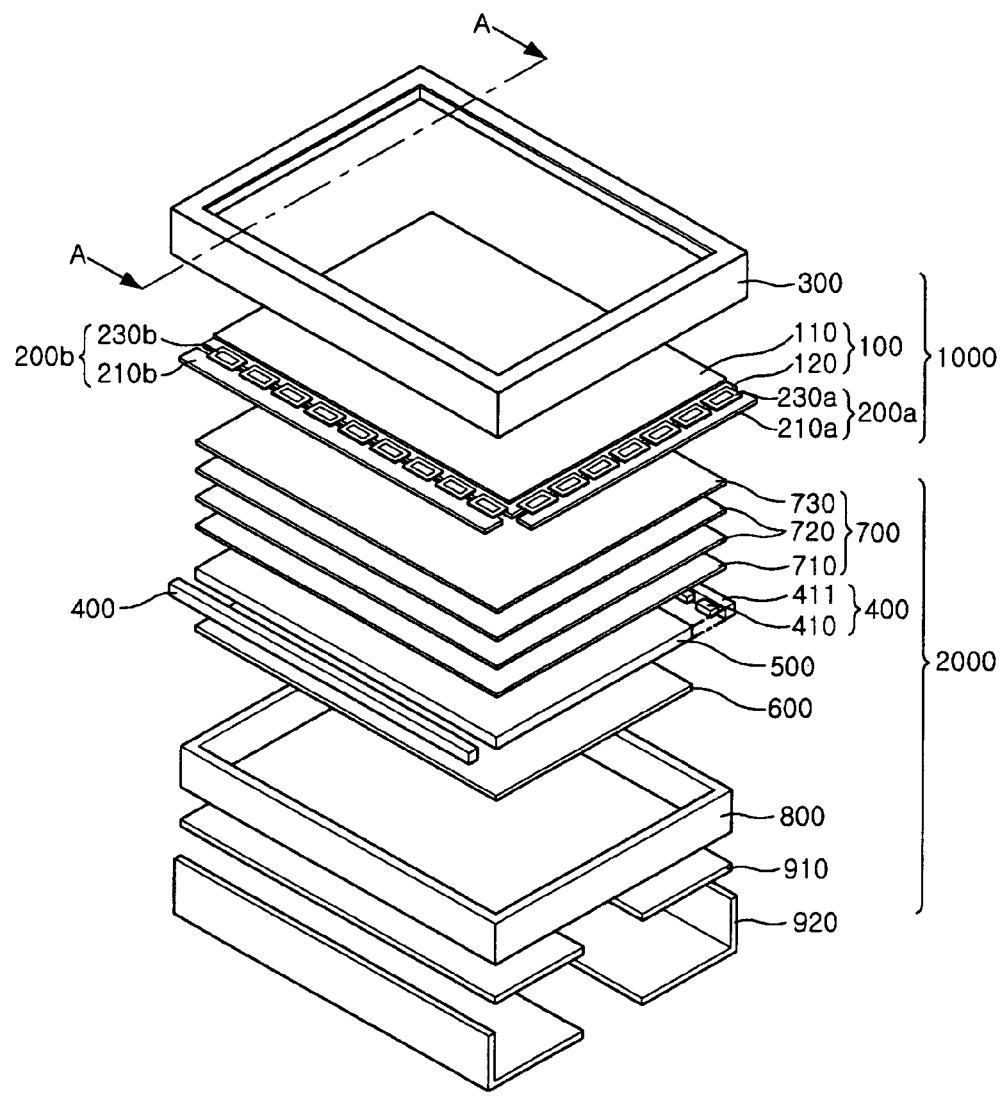
FIG. 1 is an exploded perspective view of a liquid crystal display device according to a first embodiment of the present invention.
Figure 2A:
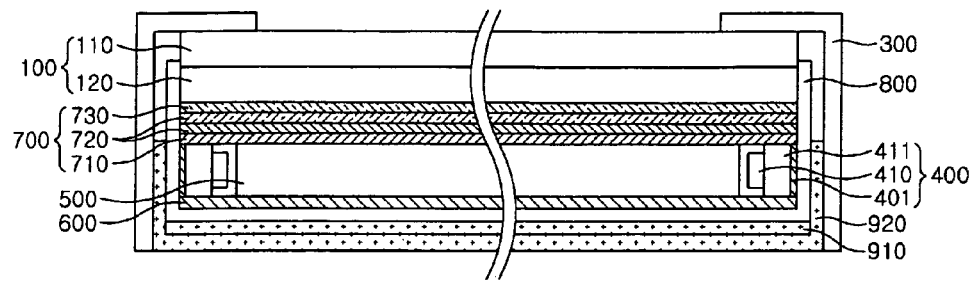
FIGS. 2a and 2b are sectional views of the liquid crystal display device taken along line A-A of FIG. 1.
Figure 2B:
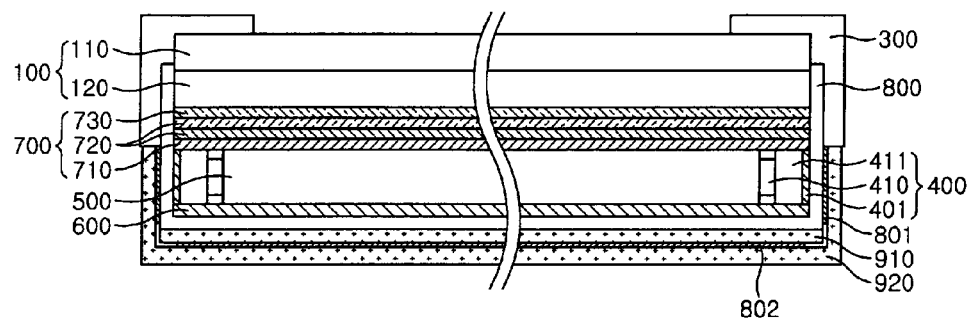

FIG. 1 is an exploded perspective view of a liquid crystal display device according to a first embodiment of the present invention. FIGS. 2a and 2b are sectional views of the liquid crystal display device taken along line A-A of FIG. 1.

Referring to FIGS. 1, 2a and 2b, the liquid crystal display (LCD) device according to the first embodiment of the present invention comprises a display assembly 1000 placed at its upper position and a backlight assembly 2000 placed at its lower position.

The display assembly 1000 includes a liquid crystal display (LCD) panel 100, a driver circuit 200 (200a, 200b), and an upper receiving member 300.

The LCD panel 100 includes a color filter substrate 110 and a thin film transistor (TFT) substrate 120. Here, the color filter substrate 110 is a substrate having RGB pixels, which are formed through a thin film process and generate a desired color when light passes through the pixels. Coated on the front surface of the color filter substrate 110 is a common electrode, which is formed of a transparent conductive material such as indium thin oxide (ITO) or indium zinc oxide (IZO).

The TFT substrate 120 is a transparent glass substrate on which a thin film transistor is formed in a matrix form. A source terminal of each of the TFTs is connected with a data line, while a gate terminal thereof is connected with a gate line. In addition, a drain terminal of each of the TFTs is formed with a pixel electrode, which is a transparent electrode made of a transparent conductive material. If an electrical signal is input to the data line and gate line, each TFT is turned on or off to apply an electrical signal needed for pixel formation in the drain terminal. If electric power is applied to the gate terminal and source terminal of the TFT substrate 120 to turn the TFT on, an electric field is generated between the pixel electrode and the common electrode of the color filter substrate 110. Thus, the liquid crystal injected between the TFT substrate 120 and the color filter substrate 110 changes its orientation, and light transmissivity is changed according to the change of the orientation, thereby providing a desired colored image.

The driver circuit 200 connected with the LCD panel 100 includes a data-side printed circuit board 210a which is equipped with a control integrated circuit (IC) and applies a desired data signal to the data line of the TFT substrate 120, a gate-side printed circuit board 210b which is equipped with a control integrated circuit and applies a desired gate signal to the gate line of the TFT substrate 120, a data-side flexible printed circuit board 230a which has an exposed ground pattern and connects the TFT substrate 120 and the data-side printed circuit board 210a to each other, and a gate-side flexible printed circuit board 230b which has an exposed ground pattern and connects the TFT substrate 120 and the gate-side printed circuit board 210b to each other.

The data-side and gate-side printed circuit boards 210a and 210b are connected with the data-side and gate-side flexible printed circuit boards 230a and 230b, respectively, to apply an external image signal and a gate drive signal. The data-side and gate-side printed circuit boards 210a and 210b may be integrally formed into a single printed circuit board, which in turn may be connected to one side of the LCD panel 100. For this purpose, of course, the gate line and data line of the TFT substrate 120 may be exposed to one side thereof.

The data-side and gate-side flexible printed circuit boards 230a and 230b are connected to the data line and to the gate line of the TFT substrate 120, respectively, to apply a data drive signal and a gate drive signal to the TFT. In addition, the flexible printed circuit board 230 is equipped with a TAB integrated circuit, which in turn transmits an RGB (read, green, blue) signal, an SSC (shift start clock) signal, an LP (latch pulse) signal, a gamma analog ground signal, a digital ground signal, digital electric power, an analog electric power common voltage, a stored voltage and the like, which are generated from the printed circuit boards 210a and 210b, to the LCD panel 100. Of course, the TFT substrate 120 may be equipped with an integrated circuit.

The upper receiving member 300 is manufactured in the form of a rectangular frame having a plane section and a sidewall section that are bent perpendicular to each other, in order to prevent the components of the display assembly 1000 from escaping therefrom and also to protect the fragile LCD panel 100 and backlight assembly 2000 against external impact. At this time, the upper receiving member 300 may be constructed to cover the entire backlight assembly 2000 including the LCD panel 100 as shown in FIG. 2a, or to cover only a part of the backlight assembly 2000 as shown in FIG. 2b.

In the meantime, the backlight assembly 2000 includes a lamp unit 400, a waveguide plate 500 coupled to the lamp unit 400, a reflective plate 600 disposed below the waveguide plate 500, a plurality of optical sheets 700 disposed above the waveguide plate 500, a lower receiving member 800 for accommodating the reflective plate 600, the waveguide plate 500 and the optical sheet 700, and heat dissipation members 910 and 920 disposed outside of the lower receiving member 800 to be adjacent to the lamp unit 400.

The lamp unit 400 is composed of a thermally conductive substrate 411 and an LED lamp 410 mounted thereon. Preferably, the LED lamp 410 uses a plurality of LEDs for emitting white light. The thermally conductive substrate 411 functions to discharge heat generated from the LED lamp 410 to the outside and also to apply a desired voltage to the LED lamp 410 mounted on the thermally conductive substrate 411. In addition, a desired depression may be formed in the thermally conductive substrate 411, and the LED lamp may also be mounted into the depression such that the thermally conductive substrate 411 surrounds the LED lamp 410 to provide a reflective surface thereto, thereby maximizing light efficiency. The thermally conductive substrate 411 may be mounted with at least one LED lamp 410. Furthermore, in this embodiment, it is more effective that a pair of lamp units 400 are disposed on the opposing inner wall surfaces of the lower receiving member 800. In addition, a cold cathode fluorescent lamp may be used as a lamp unit. Moreover, a thermal pad 401 may be formed between the thermally conductive substrate 411 and the lower receiving member 800 to allow heat from the thermally-conductive substrate 411 to be transferred to a sidewall area of the lower receiving member 800 brought into contact with the thermally conductive substrate 411. The thermal pad 401 can reduce thermal resistance at the interface between the substrate and the lower receiving member.

The waveguide plate 500 is disposed in the lower receiving member 800 to be placed between the lamp units 400 and converts light distribution of a line light source generated from a plurality of lamp units 400 into a light distribution of a surface light source. Here, a wedge-type plate or parallel flat plate may be used as the waveguide plate 500. In addition, it is preferred that the waveguide plate 500 be made of polymethylmethacrylate (PMMA), which generally has high strength and thus cannot be easily deformed or broken as well as has good transmissivity. The waveguide plate 500 may be either spaced apart from the lamp unit by a certain distance as shown in FIG. 2a or brought into contact with the lamp unit 400 as shown in FIG. 2b. Of course, a part of the lamp unit may overlap with the waveguide plate.

The reflective plate 600 is made of a plate with high light reflectivity such that light incident thereon through a rear surface of the waveguide plate 500 is reflected again to the waveguide plate 500, thereby reducing light loss. The reflective plate 600 is installed to come into contact with the bottom of the lower receiving member 800. Although it has been illustrated in the figures that the reflective plate 600 is flat, the reflective plate may be manufactured into a corrugated form having a triangular projection protruding from a reference reflective surface. Further, if the lower receiving member 800 is provided with a highly reflective material at its bottom, the additional reflective plate 600 may be omitted or formed integrally with the lower receiving member 800.

A plurality of optical sheets 700 includes a diffusion sheet 710, a polarization sheet 720 (shown as two polarization sheets), and a luminance-improving sheet 730, which are disposed above the waveguide plate 500 to cause the luminance distribution of the light emitted from the waveguide plate 500 to be uniform. The diffusion sheet 710 allows the light incident from the lower waveguide plate to be directed towards the front surface of the LCD panel 100 and then to be diffused and uniformly distributed in a wide range such that the diffused light can be radiated on the LCD panel 100. Preferably, the diffusion sheet 710 is formed of a transparent resin film of which both sides are coated with a desired light diffusion member. The polarization sheet 720 functions to convert light incident thereon at an inclined angle into light emitted vertically from the polarization sheet 720. The reason that the polarization sheet is used is that the light efficiency is maximized when the light is incident perpendicularly to the LCD panel 100. Therefore, at least one polarization sheet 720 may be disposed below the LCD panel 100 such that the light can be emitted from the polarization sheet 720 to be perpendicular to the LCD panel 100. In this embodiment, two polarization sheets can be used, which include a first polarization sheet for polarizing the light from the diffusion sheet in a certain direction and a second polarization sheet for polarizing the light in a direction perpendicular to the first polarization sheet. The luminance-improving sheet 730 functions to transmit light parallel to its own transmission axis but reflect light perpendicular to the transmission axis. In order to increase transmission efficiency, the transmission axis of the luminance-improving sheet 730 is preferably coincident to the polarization axis of the polarization sheet 720.

The lower receiving member 800 takes the shape of a rectangular box with an open top such that a receiving space with a desired depth is formed therein The lower receiving member 800 includes a bottom plate and sidewalls extending vertically from respective sides of the bottom plate. The lamp units 400 are disposed at the inner sides of two opposing sidewalls, respectively, in the lower receiving member 800. The heat dissipation members 910 and 920 are disposed outside of the bottom plate and two opposing sidewalls of the lower receiving member 800 corresponding to areas where the lamp units 400 are installed. Here, the lower receiving member 800 is made of a material, preferably aluminum in this embodiment of the present invention, capable of protecting the lamp units 400 against external impact and uniformly distributing heat to thereby provide a cooling effect.

The heat dissipation members 910 and 920 include a first heat dissipation member 910 which is disposed outside of the bottom plate of the lower receiving member 800 corresponding to an area where the lamp units 400 are disposed, and a second bent heat dissipation member 920 which has a bent portion and wraps around the first heat dissipation member 910 and the sidewalls of the lower receiving member 800 where the lamp units 400 are disposed. The first heat dissipation member 910 is made of a material with good thermal conductivity (i.e., 250 to 450 W/mK) such that heat transferred from the second heat dissipation member 920 can be uniformly distributed on the bottom plate of the lower receiving member 800. Preferably, the first heat dissipation member 910 is made of a graphite material. At this time, the first heat dissipation member 910 is preferably formed to be flat without any bent portions. This is because if the graphite material is bent, the layers constituting the graphite material may be peeled off from one another, and thus, the processability and assembling performance and thermal conductivity are degraded. The second heat dissipation member 920 is made of a material with good thermal conductivity such that heat from the sidewalls of the lower receiving member 800 brought into contact with the lamp units 400 can be transferred to the first heat dissipation member 910. Preferably, the second heat dissipation member 920 is made of copper or a copper-containing material. Of course, the present invention is not limited thereto, and a variety of metals with good thermal conductivity may also be employed. As shown in the figures, the second heat dissipation member 920 is bent into an L-shape, and a vertical section thereof is brought into contact with the sidewall of the lower receiving member 800 with which the lamp unit 400 is contacted whereas a horizontal section thereof is brought into contact with the first heat dissipation member 910. Here, the vertical section may be brought into contact with the entire sidewall of the lower receiving member 800 with which the lamp unit 400 is contacted, or it may be brought into contact with only an area of the sidewall of the lower receiving member corresponding to the lamp unit 400. The connections between the heat dissipation members 910 and 920 and between the heat dissipation members 910 and 920 and the lower receiving member 800 may be made using an adhesive with good thermal conductivity.

In order to reduce the thermal resistance at the interface between the heat dissipation members 910 and 920 and between the heat dissipation members 910 and 920 and the lower receiving member 800, the thermal pads 801 and 802 (FIG. 2b) may be provided. At this time, each of the thermal pads 801 and 802 is preferably made of a material with a desired adhesive property. That is, as shown in FIG. 2b, preferably, a first thermal pad 801 is provided between the lower receiving member 800 and the second heat dissipation member 920 and a second thermal pad 802 is also provided between the first dissipation member 910 and the second heat dissipation member 920. In addition, the first and second heat dissipation members 910 and 920, respectively, may be made of the same material. Only one of the first and second heat dissipation members 910 and 920 may be used.

Furthermore, separate first heat dissipation members may be brought into contact with the sidewalls and bottom plate of the lower receiving member, respectively, and a second heat dissipation member can be used for connecting the separate first heat dissipation members with each other. A modification for the connection of the heat dissipation members will be explained with reference to the accompanying drawings.

Figure 3:
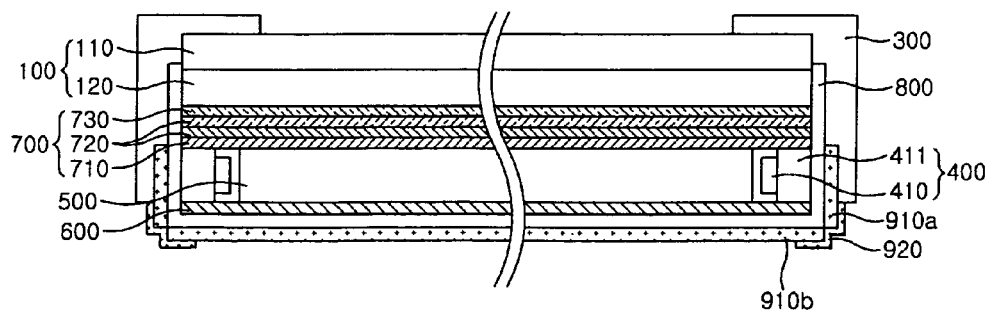
FIG. 3 is a sectional view illustrating a modified example of a heat dissipation member according to the first embodiment of the present invention.

FIG. 3 is a sectional view illustrating a modified example of the heat dissipation member according to the first embodiment of the present invention.

Referring to FIG. 3, the heat dissipation members 910a, 910b and 920 of this modified example are configured in such a manner that the first heat dissipation members 910a and 910b are separately formed into a first sidewall heat dissipation member 910a and a first bottom heat dissipation member 910b, which are connected through the second heat dissipation member 920. The first sidewall heat dissipation member 910a is brought into contact with an outer surface of the sidewall of the lower receiving member 800 with which the lamp unit 400 is contacted. The first bottom heat dissipation member 910b is brought into contact with an outer surface of the bottom of the lower receiving member 800. The first sidewall heat dissipation member 910a and the first bottom heat dissipation member 910b are connected through the second heat dissipation member 920 which transfers heat from the first sidewall heat dissipation member 910a to the first bottom heat dissipation member 910b. That is, if the graphite material for use in the first heat dissipation members 910a and 910b is bent, its assembling performance and thermal conductivity are degraded. It is therefore preferred that the flat heat dissipation members 910a and 910b be attached to the sidewalls and bottom plate of the lower receiving member 800, respectively, and be connected through the second heat dissipation member 920. Of course, the present invention is not limited thereto. Instead, the first sidewall or bottom heat dissipation member 910a or 910b may be further extended to overlap with each other and a thermal pad may be then used for connecting the heat dissipation members without need for the second heat dissipation member 920.

The heat dissipation in the LCD device according to this embodiment of the present invention will be briefly explained with reference again to FIGS. 1 and 2a. The heat discharged from the lamp unit 400 is transferred to the sidewalls of the lower receiving member 800 brought into contact with the lamp unit and then widely distributed over the bottom plate of the lower receiving member 800 through the heat dissipation members 910 and 920 brought into contact with the sidewalls and bottom plate of the lower receiving member 800. That is, the heat emitted when the LED lamp 410 of the lamp unit 400 is turned on is transferred to the thermally conductive substrate 411 brought into contact with the LED lamp 410. The heat transferred to the thermally conductive substrate 411 is transferred first to a side portion of the second heat dissipation member 920 through the sidewall of the lower receiving member 800 and then to the first heat dissipation member 910 brought into contact with the bottom plate of the lower receiving member 800 through a bottom portion of the second heat dissipation member 920. The heat transferred to the first heat dissipation member 910 is transferred to the bottom plate of the lower receiving member 800 from which the heat can be dissipated. According to this heat transfer path, since the thermal conductivity of the lower receiving member 800 is lower than that of the heat dissipation members 910 and 920, the heat can be transferred through the sidewalls of the lower receiving member 800 to second head dissipation member 920 and then to first heat dissipation member 910 to thereby enhance the thermal conductivity of the structure including lower receiving member 800. Absent the structure added by this invention, heat is transferred only through the receiving member 800 and, there is a problem in that a local temperature difference may occur within the backlight assembly 2000 (FIG. 1).

The display assembly 1000 and backlight assembly 2000 of the present invention having the aforementioned features and construction are assembled and manufactured into an LCD device. The assembling and manufacturing processes will be hereinafter described in brief. The lamp unit 400, the reflective plate 600 and the waveguide plate 500 are disposed in the receiving space of the lower receiving member 800. The lamp unit 400 is disposed to come into close contact with both opposing sides of the lower receiving member 800. The first heat dissipation member 910 (FIGS. 2*a* and 2*b*) is disposed on the outer surface of the bottom plate of the lower receiving member 800 within which the lamp units are disposed, and the second heat dissipation member 920 is disposed to wrap around the first heat dissipation member 910 and the sidewall of the lower receiving member 800. Here, it is preferred that the heat dissipation members 910, 920 and the lamp unit 400 be coupled with the lower receiving member 800 by means of bolts. Thereafter, the optical sheet 700 and the LCD panel 100 are disposed above the lamp unit 400 and then covered with the upper receiving member 300, thereby completing the LCD device of the present invention.

Furthermore, in the present invention, the sidewall of the lower receiving member 800 may be used as a heat dissipation member, and thus, a LCD device can be lightened and the assembling performance can be improved. In addition, the present invention may be applied to a chip-on-glass (COG) structure where the drive IC is formed in the LCD panel.

Hereinafter, a liquid crystal display device according to a second embodiment of the present invention in which the lower receiving member is integrally formed with a heat dissipation member with good thermal conductivity will be explained with reference to the accompanying drawings. In describing the second embodiment of the present invention, the same descriptions as in the first embodiment will be omitted.

Second Embodiment

Figure 4:
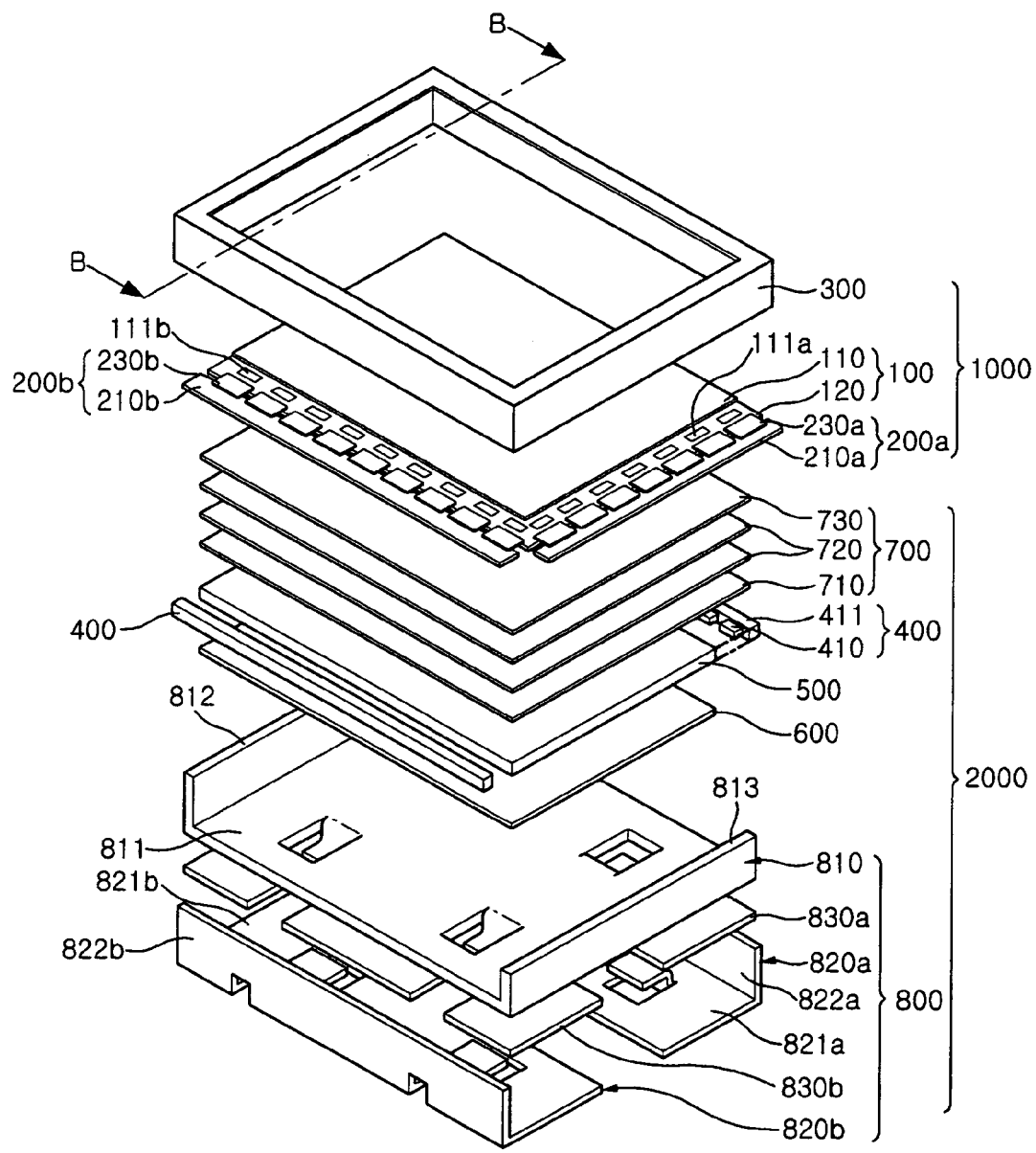
FIG. 4 is an exploded perspective view of a liquid crystal display device according to a second embodiment of the present invention.
Figure 5:
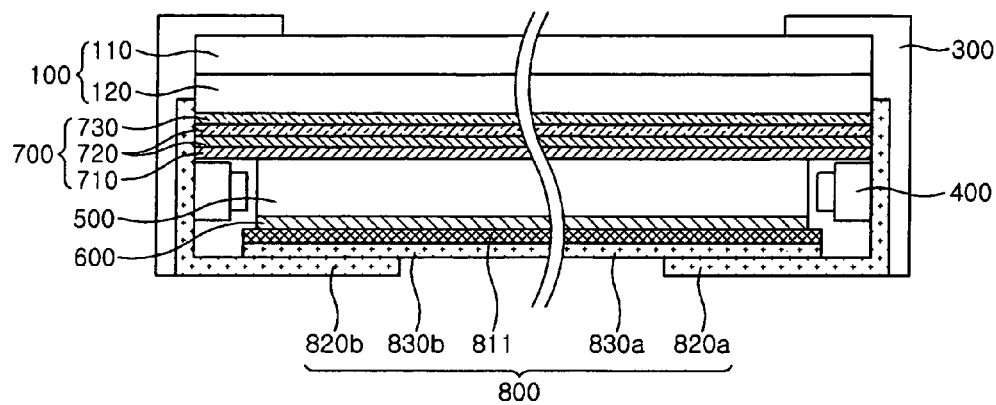
FIG. 5 is a sectional view of the liquid crystal display device taken along line B-B of FIG. 4.
Figure 6:
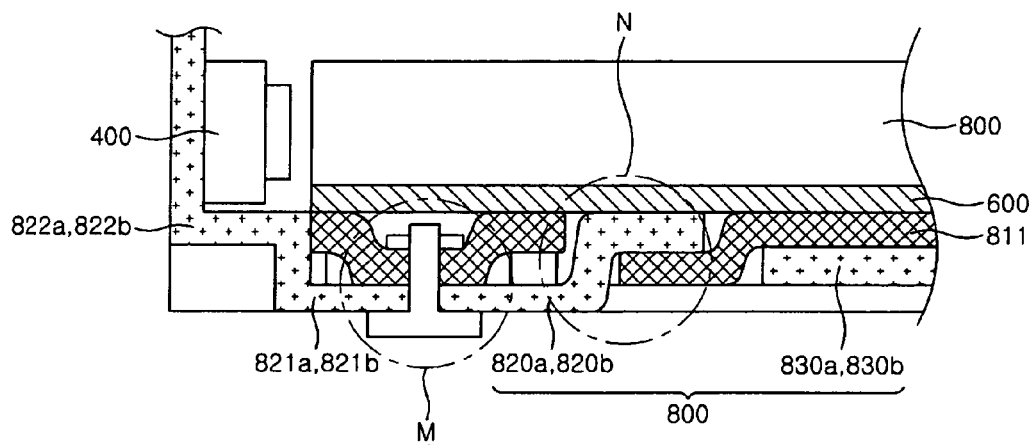
FIG. 6 is a sectional view illustrating the connection of a lower receiving member according to the present invention.

FIG. 4 is an exploded perspective view of a liquid crystal display (LCD) device according to a second embodiment of the present invention. FIG. 5 is a sectional view of the LCD device taken along line B-B of FIG. 4. FIG. 6 is a sectional view illustrating the connection of a lower receiving member according to the present invention.

Referring to FIGS. 4 to 6, the LCD device according to this embodiment comprises a display assembly 1000 and a backlight assembly 2000.

The display assembly 1000 includes an LCD panel 100, a drive circuit 200 (200*a*, 200*b*) and an upper receiving member 300. The LCD panel 100 includes a color filter substrate 110 and a TFT substrate 120.

The TFT substrate 120 includes a data-side drive IC 111*a* for transmitting an image signal to a data line of the TFT and a gate-side drive IC 111*b* for transmitting a gate signal to a gate line of the TFT, in addition to a cell array composed of TFTs and pixel electrodes in a matrix form.

The driver circuit 200 includes a data-side printed circuit board 210*a* which is equipped with a control integrated circuit (IC) and applies a desired data signal to the data line of the TFT substrate 120, a gate-side printed circuit board 210*b* which is equipped with a control integrated circuit and applies a desired gate signal to the gate line of the TFT substrate 120, a data-side flexible printed circuit board 230*a* which connects the TFT substrate 120 and the data-side printed circuit board 210*a* to each other, and a gate-side flexible printed circuit board 230*b* which connects the TFT substrate 120 and the gate-side printed circuit board 210*b* to each other. Here, unlike the first embodiment of the present invention, the flexile printed circuit board 230 is not equipped with a drive IC, which is otherwise installed in the TFT substrate.

The backlight assembly 2000 includes a lower receiving member 800 having lateral end portions 820*a* and 820*b*, heat dissipation members 830*a* and 830*b* and a receiving body portion 810, lamp units 400 mounted respectively to the lateral end portions 820*a* and 820*b*, a waveguide plate 500 coupled to the lamp units 400, a reflective plate 600 installed below the waveguide plate 500, and a plurality of optical sheets 700 installed above the waveguide plate 500. At this time, the reflective plate 600, the waveguide plate 500 and the optical sheets 700 are received within the lower receiving member, while the heat dissipation members 830*a* and 830*b* are disposed on the outer sides of a bottom plate of the body portion.

The lower receiving member 800 is composed of the lateral end portions 820*a* and 820*b*, the heat dissipation members 830*a* and 830*b*, and the body portion 810, and consequently, takes the shape of a rectangular box with an open top such that a receiving space with a desired depth can be formed therein. That is, the body portion 810 of the lower receiving member 800 includes a bottom plate 811, and first and second sidewalls 812 and 813 protruding from the opposing sides of the bottom plate 811 positioned in a first direction of the bottom plate 811. The lateral end portions 820*a* and 820*b* include connecting sections 821*a* and 821*b* which will be coupled with the bottom plate 811 at the other opposing sides positioned in a second direction perpendicular to the first direction, and third and fourth sidewalls 822*a* and 822*b* which are bent and protrude from the connecting sections 821*a* and 821*b*, respectively. Therefore, the first and second sidewalls 812 and 813 of the body portion 810 and the third and fourth sidewalls 822*a* and 822*b* of the lateral end portions 820*a* and 820*b* form the sidewalls of the lower receiving member 800, so that the lower receiving member 800 generally takes the shape of a rectangular box with an open top.

At this time, the lamp units 400 are disposed, respectively, in the lateral end portions 820*a* and 820*b*, and the heat dissipation members 830*a* and 830*b* are disposed between the outer surface of the bottom plate 811 of the body portion 810 and the lateral end portions 820*a* and 820*b*. Thus, heat discharged from the lamp units 400 can be diffused into the body portion 810 to thereby reduce thermal stress in the backlight assembly 2000.

Here, it is preferred that the body portion 810 be made of aluminum or an aluminum alloy. The lateral end portions 820*a* and 820*b* are manufactured of a material with superior thermal conductivity as compared with the body portion 810. Preferably, the lateral end portions 820*a* and 820*b* are made of copper or a variety of copper alloys with higher thermal conductivity than the body portion 810. Further, it is effective to use the lateral end portions 820*a* and 820*b* bent in an 'L' shape, as shown in FIGS. 4 and 5. Therefore, the heat generated from the lamp unit 400 can be discharged to the outside through the lateral end portions 820a and 820b.

Since the heat dissipation members 830a and 830b with superior thermally conductivity are disposed between the lateral end portions 820a and 820b and the body portion 810, the heat transferred from the lateral end portions 820a and 820b is applied to the heat dissipation members 830a and 830b, which in turn distribute the transferred heat widely over the bottom plate 811 of the body portion 810. Accordingly, thermally stress caused by the lamp units 400 can be effectively reduced. Here, it is preferred that each of the heat dissipation member 830a and 830b be made of at least one of copper, copper alloy or graphite. Further, according to this embodiment, the heat dissipation members 830a and 830b may be manufactured in the form of a flat plate to thereby enhance the assembling performance of the member made of graphite.

Therefore, the thermal pad for heat transfer, which has been used at the interface between different materials, is not necessary. Further, since the heat dissipation members can be assembled together at the same time when the lateral end portions and the container body are assembled together, the assembling process can be simplified. In addition, since the lower receiving member 800 is made of a material with a good heat-dissipating property and good resistance to external impact, the path for discharging heat from the lamp units can be reduced.

In this embodiment, the lower receiving member 800 has been fabricated by coupling the lateral end portions 820a and 820b, the heat dissipation members 830a and 830b, and the body portion 810. To couple these elements with one another, a variety of methods may be employed. To this end, a thermally conductive adhesive pad, a mechanical connection member such as a screw, or a modified structure of the lateral end portions 820a and 820b and the body portion 810 may be employed.

Hereinafter, the connections between the body portion 810, the lateral end portions 820a and 820b, and the heat dissipation members 830a and 830b will be explained with reference to FIG. 6 illustrating a sectional view of the lower receiving member 800 having a desired connection structure.

As shown in FIG. 6, the lateral end portions 820a and 820b, the heat dissipation members 830a and 830b, and the body portion 810 are formed, respectively, with grooves at certain portions thereof, and a bolt and nut can be used to connect these elements with one another such that some parts of the lateral end portions 820a and 820b and body portion 810 overlap with each other (refer to an area "M" in FIG. 6). That is, a bent portion is formed such that end portions of the connecting sections 821a and 821b of the lateral end portions 820a and 820b are interlocked with the bottom plate 811 of the body portion 810 corresponding thereto (refer to an area "N" in FIG. 6). In such a case, the sidewalls of the lower receiving member 800, to which the lamp units are coupled, are separately manufactured of a thermally conductive material and are then coupled to fabricate the lower receiving member 800. Thus, the heat transfer path of heat generated from the lamp units 400 can be shortened. Therefore, the heat transfer path for heat from the lamp units 400 can be reduced, and the heat from the lamp units 400 can be discharged directly to the outside and distributed widely over the bottom plate 811 of the lower receiving member 800. In this embodiment, the lower receiving member 800 can be assembled in a state where the lamp units have been mounted on the lateral end portions 820a and 820b of the lower receiving member 800, or the LED lamp may be mounted on the lateral end portions 820a and 820b.

Figure 7:
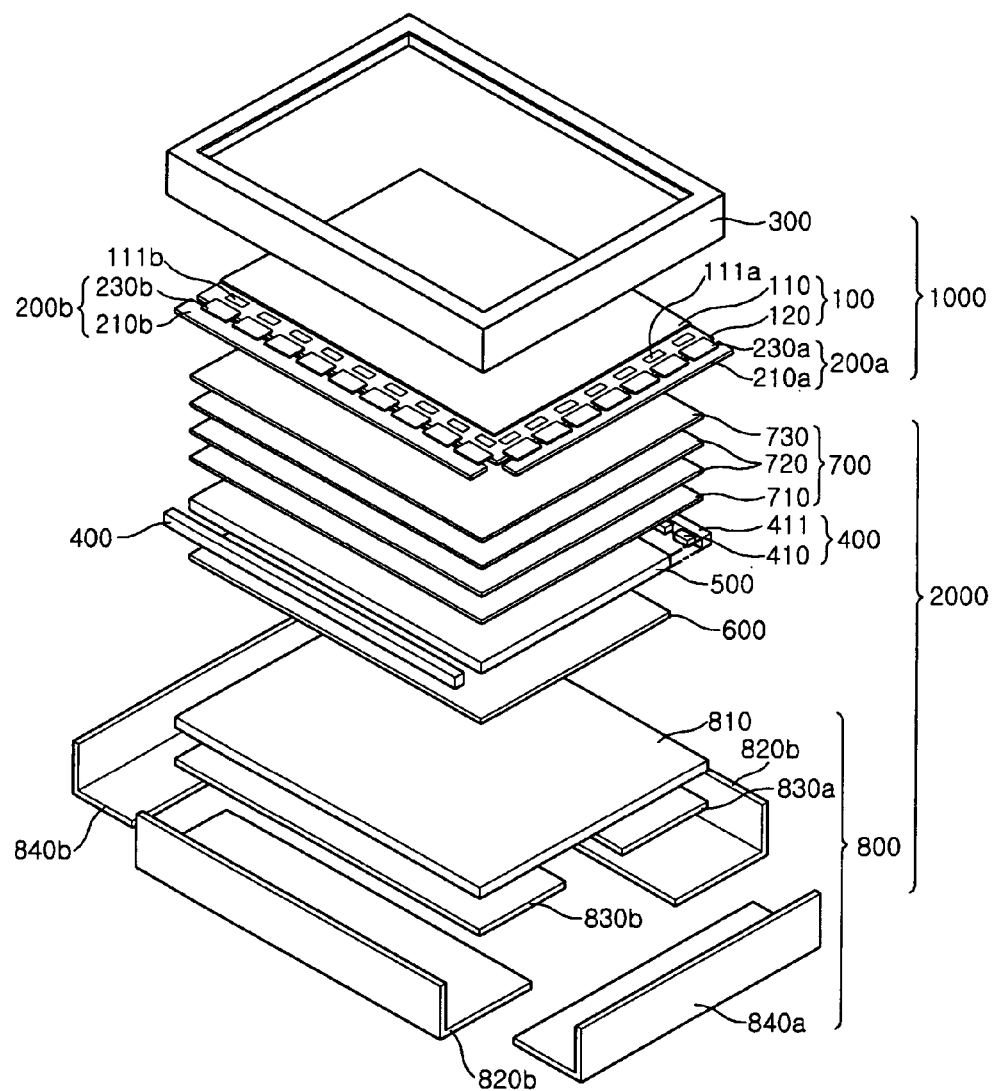
FIG. 7 is an exploded perspective view of a liquid crystal display device according to a modified embodiment of the present invention.

In addition, in this embodiment, the lower receiving member 800 can be manufactured to include four separate lateral end portions 820a, 820b, 840a and 840b. That is, as shown in FIG. 7, the lower receiving member 800 includes a plate-shaped body portion 810, lateral end portions 820a, 820b, 840a and 840b connected to the outside of the body portion 810 for defining sidewalls of the lower receiving member 800, and heat dissipation members 830a and 830b disposed between the body portion 810 and the lateral end portions 820a, 820b, 840a and 840b.

One set of the lateral end portions 840a and 840b are coupled with the opposing sides of the body portion 810 positioned in the first direction and thus become the sidewalls of the lower receiving member 800, and the other set of the lateral end portions 820a and 820b are coupled to the other opposing sides of the body portion 810 positioned in the second direction and thus become sidewalls of the lower receiving member 800. Here, the lamp unit 400 is disposed on at least one of the lateral end portions 820a, 820b, 840a and 840b.

As described above, according to the present invention, the bent heat dissipation members are provided at outer surfaces of the sidewalls of the lower receiving member where the lamp units are mounted, and the flat heat dissipation member, made in one embodiment of graphite, is provided at an outer surface of the bottom plate of the lower receiving member. Thus, heat discharged from the lamp units can be distributed widely and uniformly over the bottom plate of the lower receiving member, thereby reducing thermal stress.

Further, since the sidewalls of the lower receiving member to which the lamp units are mounted are made of a material with good thermal conductivity, the heat transfer path for heat discharge can be reduced and the assembly of the structure including the lower receiving member 800 can be done relatively more easily and reliably.

Furthermore, a heat transfer path can be formed without need to bend the heat dissipation member made of graphite.

Although the present invention have been illustrated and described in connection with the preferred embodiments and the accompanying drawings, it is not limited thereto but defined by the appended claims. Accordingly, it will be readily understood by those skilled in the art that various modifications and changes can be made thereto without departing from the spirit and scope of the present invention defined by the appended claims.

What is claimed is:

1. A backlight assembly, comprising:
   a light source;
   a receiving member having a rectangular shape comprising a bottom plate and four sidewalls extending from respective sides of the bottom plate, the receiving member having an inner surface and an outer surface, the receiving member receiving the light source, the light source being adjacent to the inner surface of one of the sidewalls;
   a first heat dissipation member disposed on the outer surface of the bottom plate of the receiving member; and
   a second heat dissipation member disposed on the outer surface of the one of the sidewalls of the receiving member and on the first heat dissipation member.

2. The backlight assembly as claimed in claim 1, wherein the first heat dissipation member comprises a flat plate disposed on a portion of the bottom plate, the portion of the bottom plate being adjacent to the light source.

3. The backlight assembly as claimed in claim 2, wherein the first heat dissipation member includes copper, copper alloy, or graphite, and the second heat dissipation member includes copper or copper alloy.

4. The backlight assembly as claimed in claim 1, wherein the second heat dissipation member has a bent shape and closely conforms to the first heat dissipation member and the one of the sidewalls of the receiving member adjacent to the light source.

5. The backlight assembly as claimed in claim 1, further comprising:
   a first thermal pad disposed between the second heat dissipation member and the receiving member; and
   a second thermal pad disposed between the first heat dissipation member and the second heat dissipation member.

6. A backlight assembly comprising:
   a light source;
   a receiving member comprising a lateral side and a bottom plate having an inner surface and an outer surface, the receiving member receiving the light source adjacent the inner surface;
   a first heat dissipation member disposed adjacent the outer surface of the receiving member;
   a second heat dissipation member adjacent the lateral side of the receiving member and the first heat dissipation member;
   a first thermal pad disposed between the second heat dissipation member and the receiving member; and
   a second thermal pad disposed between the first heat dissipation member and the second heat dissipation member.

7. A backlight assembly, comprising:
   a receiving member comprising:
      a body portion having an inner surface and an outer surface;
      a lateral end portion coupled with the body portion, the body portion and the lateral end portion defining a receiving space such that the lateral end portion forms at least one sidewall of the receiving space; and
      a heat dissipation member positioned between the outer surface of the body portion and the lateral end portion; and
   a light source received in the receiving space adjacent the inner surface of the body portion,
   wherein the lateral end portion is connected to an edge area of the body portion to define the sidewall of the receiving space.

8. The backlight assembly as claimed in claim 7, wherein the lateral end portion includes thermally conductive copper or copper alloy, and the heat dissipation member includes copper, copper alloy, or graphite.

9. The backlight assembly as claimed in claim 7, wherein the body portion includes a rectangular bottom plate and at least one body portion sidewall protruding from the bottom plate, and the lateral end portion is connected to the edge area of the body portion where the body portion sidewall is not formed.

10. The backlight assembly as claimed in claim 9, wherein the lateral end portion includes a connecting section to be coupled with the bottom plate of the body portion, and a sidewall bent and extending from the connecting section.

11. The backlight assembly as claimed in claim 10, wherein the light source is disposed on and connected to the sidewall formed by the lateral end portion.

12. The backlight assembly as claimed in claim 7, wherein the light source is disposed on and connected to the sidewall.

13. The backlight assembly as claimed in claim 1 or 7, wherein the light source includes an LED lamp.

14. The backlight assembly as claimed in claim 1 or 7, further comprising a reflective plate disposed below the light source.

15. The backlight assembly as claimed in claim 1 or 7, further comprising an optical sheet disposed above the light source.

16. A liquid crystal display device, comprising:
   a backlight assembly including a light source for generating light, a receiving member for receiving the light source, the receiving member including a bottom plate and sidewalls extending upwards from the bottom plate, a first heat dissipation member disposed below the receiving member on a bottom surface of the bottom plate, and a second heat dissipation member disposed on one of the sidewalls of the receiving member and on the first heat dissipation member; and
   a liquid crystal display panel for displaying an image using the light supplied from the backlight assembly.

17. The liquid crystal display device as claimed in claim 16, wherein the first heat dissipation member includes copper, copper alloy, or graphite, the first heat dissipation member comprising a flat plate disposed on a portion of the bottom plate, the portion of the bottom plate being adjacent to the light source.

18. The liquid crystal display device as claimed in claim 16, wherein the second heat dissipation member includes copper or copper alloy, the second heat dissipation member having a bent shape closely conforming to the first heat dissipation member and to the one of the sidewalls of the receiving member, the one of the side walls being adjacent to the light source.

19. The liquid crystal display device as claimed in claim 16, wherein the light source including an LED lamp is disposed adjacent to at least a portion of the one of the sidewalls of the receiving member.

20. A liquid crystal display device, comprising:
   a backlight assembly including:
      a receiving member comprising a body portion having an inner surface and an outer surface, a lateral end portion coupled with the body portion, the body portion and the lateral end portion defining a receiving space such that the lateral end portion forms at least one sidewall of the receiving space, and a heat dissipation member positioned between the outer surface of the body portion and the lateral end portion and a light source received in the receiving space adjacent the inner surface of the body portion; and
   a liquid crystal display panel for displaying an image using the light supplied from the backlight assembly,
   wherein the lateral end portion is connected to an edge area of the body portion to define the sidewall of the receiving space.

21. The liquid crystal display device as claimed in claim 20, wherein the lateral end portion includes thermally conductive copper or copper alloy, and the heat dissipation member includes copper, copper alloy, or graphite.

22. The liquid crystal display device as claimed in claim 20, wherein the body portion includes a rectangular bottom plate and at least one body portion sidewall protruding from the bottom plate, and the lateral end portion is connected to the edge area of the body portion where the body portion sidewall is not formed.

* * * * *